United States Patent Office 3,461,090
Patented Aug. 12, 1969

3,461,090
COATING USING WAX, SURFACTANT, AND FILM FORMER
Harold L. Haynes, Granville, Ohio, Gerald E. Rammel, North Attleboro, Mass., and Albert R. Morrison, Newark, Ohio, assignors to Owens-Corning Fiberglas Corporation, a corporation of Delaware
No Drawing. Filed May 13, 1966, Ser. No. 549,813
Int. Cl. C08h 8/10; D06m 15/04
U.S. Cl. 260—17.4                           6 Claims

ABSTRACT OF THE DISCLOSURE

An aqueous protective coating material for glass fibers, a method of producing same, and glass fibers produced by the method, wherein a melted paraffin wax having a melting point below approximately 130° F. is mixed with a mixture of polyoxethylene sorbitan monostearate and sorbitan monostearate in a ratio to give an HLB between 8 and 16. This mixture is blended with water at a temperature above 150° F. and dispersed in an aqueous starch dispersion at a temperature above 150° F. and then homogenized and applied to the glass fibers at a temperature above 150° F.

---

The present invention relates to coating materials for protecting glass fibers from their forming operation through their weaving operation; and to the glass fibers coated therewith.

Fibers for textiles are made by simultaneously attenuating several hundred small streams of molten glass to produce monofilaments each having a diameter of less than 0.0005 inch. These monofilaments are coated at forming with a protective coating usually comprising a binder and lubricant by pulling the fibers over a pad saturated with the coating. The monofilaments are thereafter brought together into a strand by being pulled through a gathering head and the strand is wound upon a revolving spool or drum which pulls the monofilaments through the above mentioned apparatus. Although glass has a tensile strength of over 400,000 pounds per square inch, prior art strands have never been this strong because of breakage of the monofilaments during forming. Glass is easily broken when scratched and the monofilaments are extremely sensitive to abrasion because of their large surface to volume ratio. Abrasion of the monofilaments may occur either when they are drawn over stationary guide surfaces or when they are rubbed together. Since the glass fibers are subjected to numerous bending operations during their fabrication, and since glass breaks easily when its surface is scratched any abrasion of the monofilaments may result in fracture of these monofilaments, and the ends adjacent the fracture project outwardly of the strand to produce what is known as fuzz.

Strands of glass fibers produced as above described are subjected to numerous types of twisting, bending, and abrading operations before the strands are woven into a useful textile product. The conditions which are experienced in this multiplicity of rubbing and bending operations are so varied that it is difficult, if not impossible, to produce a single coating lubricant which will completely protect the fibers against breakage during twisting and weaving. The forming coatings must be applied to the filaments from a solution in order that they will completely coat the filaments. This solution is preferably an aqueous solution in order to obviate explosion and other hazards. Some forming coatings protect the fibers adequately before the water has been removed from the coating, but do poorly in the later stages of the fabricating process where the coating has been dried substantially completely.

The forming packages which are produced as above described are usually allowed to remain under ambient conditions for a sufficient length of time for approximately half of the water to migrate to the surface of the package, so that the remaining water is only approximately 6% of the total weight of the package. As the water is moving to the surface of the package, some types of coating materials migrate therewith, to produce a phenomenon known as "migration" wherein the fiber at the outer portion of the package has a higher solids content than does the fiber at the center of the package. A good forming coating must not "migrate" excessively.

After the moisture in the forming package has been reduced to approximately 6%, the glass fibers are unwound under ambient conditions and twisted onto a new package. This is called the "twisting" operation. Filaments that are broken during unwinding of the forming package will usually be stripped from the strand into what is known as a "ringer," which then accumulates until the strand breaks. Glass fibers having more than 1% water when passing from the forming package through the twisting operation onto the twist package lose moisture to the surrounding air. The fibers on the twist package contain no more than approximately 1% water. If more than approximately 1% of water remains, shrinkage of the tube onto which it is wound may result, and this shrinkage changes the lay of the fibers to bind the coils together and cause breakage of the strands upon removal from the twist package. Excess moisture in the twisted strands will also cause fuzzing in subsequent operations. If the integrity of the film former is not adequate, the film former will powder during the twisting operation.

The twisted strand from twist packages constitutes the basic material from which glass textiles are made. A plurality of the twisted strands may be brought together to produce a yarn. A plurality of yarns may be simultaneously wrapped upon a cylinder at spaced apart locations to produce a beam, and the beams may thereafter be removed to a loom for use as the warp in a weaving operation. Yarn for the fill will be wrapped into small packages called quills and these will be fed through automatic machinery to the shuttle which glides back and forth across the loom. It will be apparent that in all of these operations, the strands will be pulled over stationary guide surfaces at which time they will be flexed back and forth, and that later while being woven, they will be bent in one direction and then another until the weave is set. A coating lubricant which is too brittle may crack when dry to expose the fibers either to each other or to the guide surfaces, following which breakage is sure to occur. If the coefficient of friction of the coating material is too high with respect to the guide surfaces, the coating will be pulled from the fibers. If the coating is unduly rough, it will be caught by the guide surfaces and pulled from the fibers. In addition, the coating materials must not rub off of the fibers onto the guide surfaces to gum up the textile fabricating machinery, nor must the coatings be too powdery.

The production of glass fibers into fabrics is a major industry and a great amount of research has been done with coating lubricants for glass fibers in an effort to develop a material which would be good in all of the operations involved from forming through weaving. All types of known lubricants have been tried in various combinations. Patent 2,272,588 discloses the coating of glass fibers at forming with a molten wax material which solidifies on the fibers immediately upon being cooled. Patent 2,323,684 discloses the application of wax to glass fibers either in a molten condition or as an aqueous emulsion.

Patent 2,723,215 teaches glass fibers coated with mineral wax, an organo-silane compound and polyethylene. All of the prior are coating materials for glass fibers which have included wax, including the materials of the above enumerated patents, are deficient in that the coating smears off of the fibers onto the guide surfaces, particularly during the later stages of fabrication to both gum up the machinery and expose the fibers to abrasion and thereby produce too high a fuzz level in the finished product.

An object of the invention is the provision of a new and improved coating material for glass fibers which will more adequately protect the fibers during the later forming operations following twisting than have prior art materials.

Another object of the invention is the creation of a new and improved coating material of the above described type comprising a mixture of water and wax particles in finely divided form which is stable in the applying apparatus.

A still further object of the invention is the provision of a new and improved coating material of the above described type which retains a desired amount of water in the forming package, and which loses a desired amount of this water while the glass fibers are being transferred from the forming package to the twist package.

Further objects and advantages of the invention will become apparent to those skilled in the art to which it relates from the following description of several preferred embodiments described herein and which are intended to illustrate the principles of the invention.

It has been discovered that a coating material comprising wax particles below a predetermined size and spaced apart by a film forming material can when applied to glass fibers produce a lower fuzz level as well as lower tensions (50% less) in the later stages of manufacture of glass textiles than have prior materials. In addition the tensions are more uniform—varying between 5 to 6 grams compared with a range of 40 grams in prior art materials that do not contain the small wax particles. In addition fabrics woven from the materials of the present invention have a lower broken filament level and an absence of powder on the looms. It has further been found that such a distribution of wax particles and film former can be laid down from an aqueous solution in which the wax particles are molten and are held spaced apart by surface active agents having a proper hydrophilic-lipophilic balance hereafter called HLB. The surfactant in order to be effective must have a portion of the molecule soluble in the wax particles, and another portion which is hydrophilic and which extends out of the surface of the wax particles. The hydrophilic tails of the molecules which project from the surface of the wax particles keep the wax particles from agglomerating, during the time that the particles are molten and are present in an aqueous solution. By utilizing a proper amount of film former dispersed throughout the aqueous solution, a proper physical arrangement of wax and film former is produced upon drying of a film of the material in situ on the glass fibers. The film former may be of any suitable type for the application involved, such as starch, polyvinylalcohol, gelatin, alginate, resin, etc. It appears that the hydrophilic portion of a surfactant having a proper HLB helps to hold hydrolyzed film forming molecules in position around the molten wax particles to produce a unique physical arrangement when the material is dried in situ on glass fibers. In this respect a cationic lubricant helps to stabilize the emulsion and also helps form the film since the cationic lubricant has a portion which is attracted to the surface of the glass. It appears that the cationic lubricant causes the wax particles to be deposited adjacent the surface of the glass with more of the film former over the top of the wax particles, so that less smearing of the wax takes place when the coated fibers are pulled over stationary surfaces such as "guide eyes" etc. By having the film former coat the wax particles, the film former will be between guide surfaces and the wax to prevent adherence of the wax to the guide surfaces, while still allowing the wax to contribute its shear properties to the coating. The above is illustrated by the following example.

EXAMPLE 1

A preferred composition comprises the following:

| Ingredients: | Percent by weight |
|---|---|
| Hydroxy ethylated potato starch | 2.97 |
| Acetylated corn starch produced by the acetylation process of Patent 2,461,139 | 0.99 |
| Cationic lubricant (reaction product of tetraethylene pentamine and stearic acid) in a molar ratio of 1 to 1.8 | 0.18 |
| Paraffin wax (126° F. melting point) | 1.70 |
| Polyoxethylene sorbitan monosterate (HLB equal to 15.9) | 0.13 |
| Sorbitan monostearate (HLB equal to 5.9) | 0.12 |
| Polyvinylalcohol | 0.10 |
| Organo-tin bacterial inhibitor, 10 p.p.m. | |

The material is prepared by adding a total of 3.96 parts comprising both starches and 0.10 part of polyvinylalcohol to sixty parts of cold water in a mix tank. The mixture is continually stirred and heated to a temperature of 200° F., and is held at that temperature for thirty minutes. Thereafter twenty parts of cold water are added, and the temperature is reduced to 155° F. In a separate vessel, 1.7 parts of wax is heated to 150 to 155° F. and 0.25 part of the surfactants and 0.18 part of the cationic lubricant are added to the molten wax, and thoroughly mixed therewith. Three parts of water at a temperature of between 150 to 170° F. is slowly mixed with the molten wax and surfactant until the emulsion inverts and thins out. Thereafter another approximately six parts of water at 150 to 170° F. is added. The emulsion is then homogenized in a jet homogenizer at 2,000 pounds per square inch pressure, and is added to the main body of materials previously described. The organo-tin material mixed with a quarter part of warm water is added to the mixture, and additional water is added to adjust to the desired solids. The material is maintained at a temperature between 130 and 140° F., and is applied to glass fibers at forming using a conventional applicator pad over which the monofilaments are drawn.

Strands coated as above described, and having a coating solids of approximately 1.2% of the total weight of the strands has a migration index of 1.29, a fuzz index of 1.26, has 4% twist breaks, a quilling tension of 26 and 34 grams with no quilling fuzz or powder, has 4.6 broken filaments in the quilling operation, a beaming tension of 16 to 28 grams without deposit on the creel.

By way of contrast the previously used production material that did not contain wax but used a starch of 50% amylose content with some of the starch material being in a partially cooked condition, gave a coating of 1.50% by weight of the coated strand. This material had: a migration index of 1.37, a twist fuzz index of 1.35 with 8% twist breaks, a quilling tension of 48 to 70 grams, very light quill fuzz with light powder observed in quilling, and five broken filaments during quilling. This same material gave a beaming tension of 40 to 60 grams with very light fuzz, and moderate to heavy powder deposit on the creel.

As previously stated, the cationic lubricant appears to coact with the wax to give a preferred physical arrangement on the glass fibers. The cationic holds the wax adjacent the surface of the glass, so that the starch more fully surrounds and covers the small particles of wax. Any type of cationic lubricant can be used, as for example, any of those mentioned in the patent literature. The particular molar ratio of 1.8 parts of the stearic acid to one part of the tetraethylene pentamine gives particularly good results and is a preferred material.

The two emulsifiers used above in approximately equal proportions gives an HLB of approximately 10 which is found to be the preferred HLB for a paraffin wax. Other types of waxes can be used, as for example, beeswax, carnauba wax cerese wax, mineral waxes, Japan wax, vegetable waxes, microcrystalline wax, or the like, and mixtures thereof. The optimum HLB may vary slightly with the individual wax used but will fall generally between 8 and 16. The waxes used should preferably be of a low melting nature, so that the waxes can be applied in the molten condition without the temperature of the aqueous emulsion being excessive. Preferably the wax should have a melting point below 160° F., usually below 140° F. and most preferably below approximately 130° F.

The polyvinyl alcohol is an additional film former which helps to give a smooth uniform body to the water surrounding the wax and starch molecules. A second film former is not necessary, but others which can be used, are gelatin, animal glue, water soluble acetates, hydroxyethyl cellulose, etc. and are helpful in improving the efficiency in the twisting operation. Polyvinyl alcohol is a preferred material, however, because it burns off completely during coronization after the fibers have been woven.

Starch is a preferred film former for glass fibers because of its properties when dry. Generally speaking, the aqueous emulsified wax and film former coating materials should comprise from approximately 2% to approximately 8% by weight of solids, with the film former comprising from approximately 15% to approximately 85% by weight of the solids. The wax should comprise from approximately 5% to approximately 75% by weight of solids. The surfactant should comprise more than approximately 0.01 part per part of wax, usually between 0.1 to 0.2, and preferably have an HLB between approximately 3 and 16. The cationic lubricant is not necessary and may vary from 0 to approximately 0.80 part per part of wax and is preferably between 0.010 and 0.50 part per part of wax. A second film former is not necessary, and is effective between 0 and 0.25 part per part of film former to vary its properties.

It is not necessary that a single surfactant be used to give the proper HLB. Any two surfactants having known HLB's can be combined using the proper proportions, and if the HLB is not known for a particular surfactant, it can be calculated by one of the two following formulas:

$$HLB = 20\left(1 - \frac{S}{A}\right)$$

$$HLB = \frac{E+P}{5}$$

wherein: S is the ester saponification number; A is the acid number of the acid separated upon saponification; E is the weight percent ethoxy content; and P is the weight percent of the polyol content. For a more complete explanation of HLB and its use in surfactant chemistry, reference can be had to the article of W. C. Griffin, entitled: "Calculation of HLB Nonionic Surfactant," found in the December 1954 issue of the Journal of the Society of Cosmetic Chemistry.

As previously indicated, the coating composition is kept at a temperature above the melting point of the wax before application to the fibers, so that the particles of the wax will remain in a stable small condition. The coating composition is cooled down after application to the fibers during which time it achieves the proper distribution on the fibers, and during which time no appreciable agglomeration takes place. The particle size of the wax on the fiber therefore, would be substantially the same as that produced in the emulsion. Wax emulsions will generally have a particle size of between 0.1 micron and 20 microns, and in the preferred homogenized condition will have a particle size of between 3 and 5 microns. Because the synergistic effect of wax dispersions in protective coatings for fibers, and in particular glass fibers, is a physical one, the synergistic effect will be noted at very low concentrations.

EXAMPLE 2

A protective coating material for use on glass fibers at forming and having a low concentraton of wax, comprises the following.

| Ingredients: | Percent by weight |
|---|---|
| Hydroxy ethylated potato starch | 2.437 |
| Acetylated corn starch produced by the acetylation process of Patent 2,461,139 | 0.809 |
| Polyvinyl alcohol | 0.082 |
| Hydrogenated coconut oil | 1.042 |
| Emulsifier (polyoxyethylene sorbitan monoleate) | 0.104 |
| Emulsifier (polyoxyethylene sorbitan monostearate) | 0.002 |
| Emulsifier (sorbitan monostearate) | 0.020 |
| Cationic lubricant of Example 1 | 0.147 |
| Paraffin wax (126° F. melting point) | 0.348 |
| Water, balance. | |

This material may be prepared using the same procedure as given in Example 1, and provides an improvement over prior art starch protective coatings which do not contain these wax emulsions. Yarns coated with the material of Example 2 have lower, and more uniform tensions than do the similar materials which do not include the wax emulsion. This material, however, does not have the low level of tensions and uniformity that is provided by the preferred materials of the Example 1.

The upper limit of the amount of wax emulsion which can be used is dependent only upon the ability of the surfactant and the film former to prevent agglomeration, both when in the aqueous emulsion form, and when it is subjected to shear and turbulence during application to the fibers. The following is an example of a high concentration of wax which is stabilized in the aqueous emulsion form by the surfactant, and which can be applied to the fibers without difficulty.

EXAMPLE 3

| Ingredients: | Percent by weight |
|---|---|
| Hydroxy ethylated starch | 0.7_ |
| Hydroxy ethyl cellulose | 0._ |
| Paraffin wax (126° F. melting point) | 2._ |
| Polyoxethylene sorbitan monostearate | 0.2_ |
| Sorbitanmonostearate | 0.2( |
| Cationic lubricant of Example 1 | 0.14_ |
| Nonylphenoxypoly (ethylene oxy) ethanol | 0.04( |

This material is prepared in the same manner as that of Example 1, and when so prepared, provides a protective coating for use in the forming of glass fibers, to produce coated fibers having low and uniform tensions. There is, however, a tendency for some wax build-up on guid surfaces.

The purpose of the surfactant, and the manner in whic it operates, have already been explained. The surfactar must have an oleophilic portion for attachment to th wax, and a hydrophilic portion which will hold wate and hydrolyzed or water dispersed film formers, aroun the outside of the wax particles, to keep the particles fror agglomerating in the aqueous emulsion form. In add tion, the surfactant separates the particles of wax t cause the wax to be laid down on the fibers as separa and distinct particles separated by the film former. Th surfactant should be nonionic, and the following is a example of a stable, protected coating material forme using a nonionic surfactant having a low HLB ratio.

EXAMPLE 4

| Ingredients: | Percent by weight |
|---|---|
| Partially cooked high amylose corn starch | 2.437 |
| Acetylated corn starch of Example 1 | 0.809 |
| Hydroxy ethyl cellulose | 0.300 |
| Cationic lubricant of Example 1 | 0.147 |
| Paraffin wax (126° F. melting point) | 0.500 |
| Ethoxylated castor oil (HLB 3.6) | 1.200 |

This material produces a generally stable emulsion adequate for protective coatings on fibers, but generally necessitates a higher percentage of the surfactant in order that there is sufficient retentive power for the water soluble film formers around the outside of the wax particles.

While the invention has been described in considerable detail, we do not wish to be limited to the particular embodiments that have been described; and it is our intention to cover hereby all novel adaptations, modifications, and arrangements thereof which come within the practice of those skilled in the art to which the invention relates and which come within the scope of the following claims.

We claim:

1. An aqueous protective coating material of from 2% to 8% solids for application to fibers at a temperature above 130° F. and consisting essentially of the following solids in parts by weight:
   from 15% to 85% by weight of a mixture of hydroxy ethylated starch and an acetylated starch;
   from 5% to 75% by weight of a paraffin wax melting below approximately 130° F.;
   more than 0.01 part per part of wax of a mixture of polyoxethylene sorbitan monostearate and sorbitan monostearate in a ratio to give an HLB between 8 and 16; and
   said wax being dispersed throughout the material as particles no larger than approximately 5 microns in size.

2. The coating material of claim 1 including more than approximately 0.01 part per part of wax of a cationic lubricant.

3. The aqueous protective coating material of claim 1 comprising the following approximate percentages by weight:

1.7% of a paraffin wax having a melting point of below 130° F.,
2.97% of hydroxy ethylated starch,
0.99% of acetylated starch,
0.2% of a cationic lubricant,
0.25% of a mixture of polyoxethylene sorbitan monostearate and sorbitan monostearate having an HLB of approx. 10, and
0.10% of polyvinyl alcohol, the balance being essentially water.

4. The method of producing and applying a protective material to glass fibers, comprising: heating a paraffin wax having a melting point below 130° F. to a temperature above 150° F., blending polyoxethylene sorbitan monostearate and sorbitan monostearate in a ratio to give a resulting HLB of between 8 and 16 into the melted paraffin wax, blending water at a temperature above 150° F. with the wax and blended materials to produce a wax in water emulsion, homogenizing the emulsion while at a temperature above 150° F. to reduce the wax particle size below 5 microns, blending the emulsion when at a temperature above 150° F. with a dispersion of hydroxy ethylated starch and acetylated starch in water while at a temperature above 150° F. in a ratio of from 15 to 85% starch to 5 to 75% wax, and applying the mixture to glass fibers at a temperature above 130° F.

5. Glass fibers coated by the method of claim 4.

6. The method of claim 4 wherein a cationic lubricant is blended with the molten wax and surfactant before producing the emulsion.

References Cited

UNITED STATES PATENTS

| | | | |
|---|---|---|---|
| 2,272,588 | 2/1942 | Simison | 49—77 |
| 2,946,698 | 7/1960 | Brunnick et al. | 117—54 |
| 3,287,096 | 11/1966 | Marzocchi et al. | 65—3 |
| 3,265,479 | 8/1966 | Glaser | 65—3 |
| 3,287,096 | 11/1966 | Marochi et al. | 65—3 |

WILLIAM H. SHORT, Primary Examiner

E. NIELSEN, Assistant Examiner

U.S. Cl. X.R.

106—212; 117—126